United States Patent [19]
Bronnec

[11] 4,283,171
[45] Aug. 11, 1981

[54] HEATING DEVICE

[75] Inventor: Jean A. L. Bronnec, Brest, France

[73] Assignee: Etablissements Generaux de Mecanique de l'Ouest, Brest, France

[21] Appl. No.: 58,277

[22] Filed: Jul. 17, 1979

[30] Foreign Application Priority Data

Jul. 26, 1978 [FR] France .............................. 78 22097

[51] Int. Cl.³ .............................................. F27B 6/08
[52] U.S. Cl. ................................... 432/112; 126/149; 432/113; 432/114
[58] Field of Search ............... 432/107, 112, 113, 114; 126/149

[56] References Cited
U.S. PATENT DOCUMENTS 313,401  3/1885  Breer ..................................... 432/114

FOREIGN PATENT DOCUMENTS 955969  1/1950  France .

*Primary Examiner*—John J. Camby
*Attorney, Agent, or Firm*—Sandler & Greenblum

[57] ABSTRACT

A heating device comprising at least one drum open at both ends thereof. The drum is adapted to continuously rotate around a substantially horizontal axis. The device further comprises at least one burner arranged within the drum which itself comprises a nozzle positioned so as to direct a flame in a direction substantially perpendicular to a plane passing through the center of the drum and an air inlet for providing oxygen to the burner. A fixed divider is provided within the drum so as to divide the interior space of the drum into a central and exterior space. The burner nozzle is positioned in the exterior space formed while the air inlet to the burner is positioned within the central space.

9 Claims, 2 Drawing Figures

U.S. Patent     Aug. 11, 1981     4,283,171
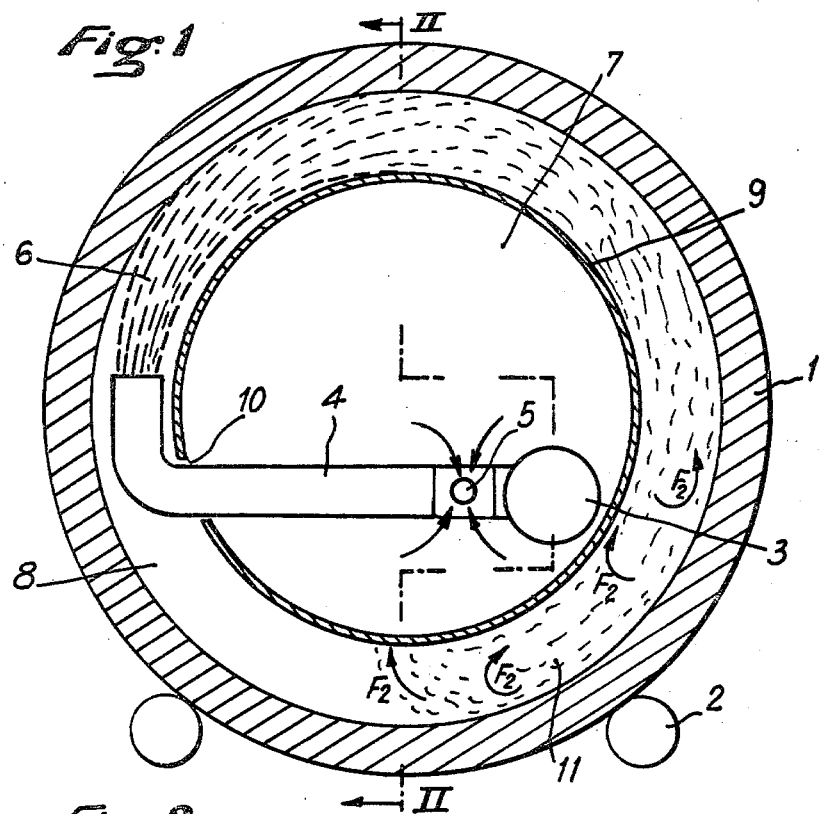
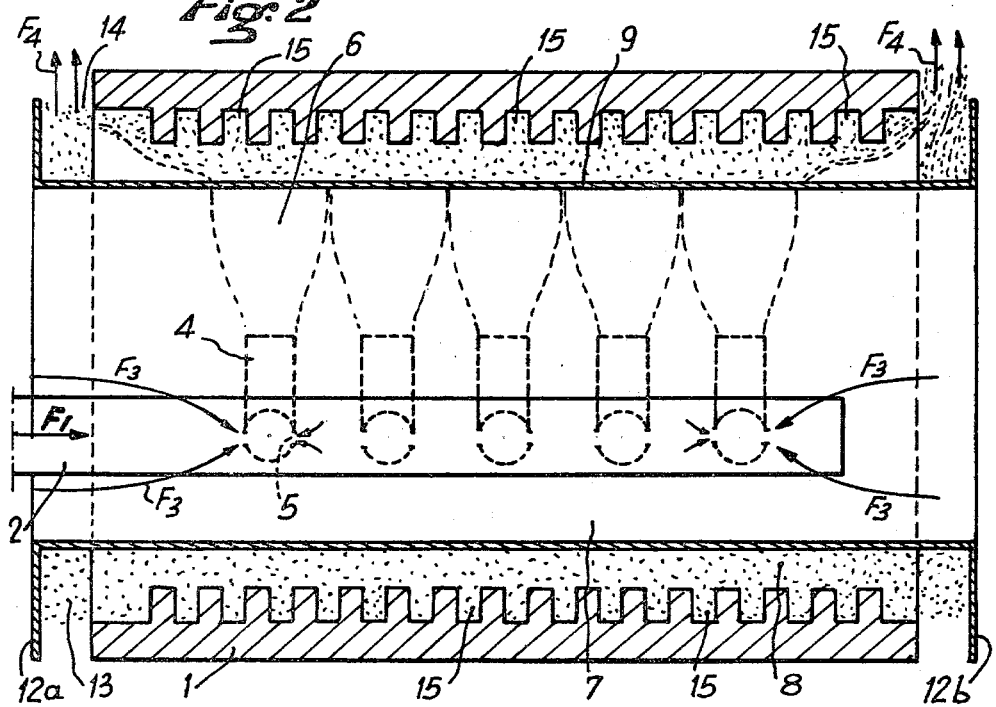

HEATING DEVICE

BACKGROUND OF THE INVENTION

1. Field of the Invention

The invention relates to heating devices such as those used for cooking and baking foods and relates particularly to continuous cooking machines which comprise a rotatable circular surface which is heated interiorly by flames.

2. Description of Prior Art

Numerous heating or cooking devices are known in industry and particularly in the food industry which operate by virtue of contact wherein the surface of the heater is the outer surface of a revolving body which generally is metallic and which rotates around a substantially horizontal axis and on the interior of which is released heat energy produced by the combustion of a gas or a liquid or even a pulverized solid. Most often the revolving body is a cylinder, but it might likewise assume various other shapes and its outer surface, instead of being perfectly smooth, may have zones or areas provided with depressions or protrusions. For purposes of this application, the term "drum" and the like as used throughout the application should therefore not be narrowly construed to drums which are merely circular but extends instead of all equivalent structures whatever their general shape and whatever the state of their outer surfaces.

Generally, in the known materials up until now, the flames produced by burners which open adjacent to the interior wall of the heater each of which has a nozzle arranged in a direction substantially perpendicular to the corresponding diametral plane contact the interior surface before mixing between the flames in a turbulent or whirling movement occurs. The hot burned gases escape upwardly via the two ends of the drum thus creating a suction which draws the fresh air which penetrates via the ends of the drum so as to be brought towards the burners. As a result of this arrangement two inconveniences occur. The combustive fresh air mixes with the burned gas and is thus deprived of oxygen and, furthermore, the rush of fresh air cools the interior surface of the drum.

In certain apparatus, so as to avoid this cooling, the burners are fed with a mixture of air and of gas which is formed at the exterior of the drum. This solution to the problem requires a more complex installation, which is more costly and, furthermore, the transportation through the piping of the air-gas mixture raises serious dangers of explosion.

SUMMARY OF THE INVENTION

It is, therefore, an object of the invention to furnish a heater drum in which the hot gases are maintained in contact with the interior surface of the wall of the drum until the gases escape via the ends during which the interior surface of the drum is out of contact with the fresh air.

According to the invention a heating device is provided comprising at least one drum open at both ends thereof. The drum is adapted to continuously rotate around a substantially horizontal axis. The device further comprises at least one burner arranged within the drum which itself comprises a nozzle positioned substantially perpendicular to a plane passing through a diametral plane of the drum and an air inlet for providing oxygen to the burner. A fixed divider is provided within the drum so as to divide the interior space of the drum into a central and exterior space. The burner nozzle is positioned in the exterior space formed while the air inlet to the burner is positioned within the central space.

According to a preferred embodiment of the invention the divider may either flared or bent at substantially right angles for purposes of directing heated gases generated within the central space out of said drum without contacting fresh gases being fed to the air inlet.

In yet another preferred embodiment of the invention the interior of the drum may be provided with grooves for directing heated gases upwardly along the surface of the interior of the drum.

The drum may further comprise recesses and protrusions for increasing the surface area of contact between the heated gases within the exterior space of the drum and the drum.

BRIEF DESCRIPTION OF THE DRAWINGS

With reference to the annexed drawings, given by way of example only:

FIG. 1 is a cross-sectional view of a cooking drum according to the invention; and FIG. 2 is a longitudinal cross-sectional view along line II—II of FIG. 1.

DESCRIPTION OF PREFERRED EMBODIMENTS

In order to obtain the highest yield and to save most on energy, it is necessary on the one hand to maintain the hot gas of the flames in contact with the greatest possible surface of the interior wall of the heating drum for as long as possible, and, on the other hand, to feed the combustion with a sufficient quantity of combustive air while at the same time preventing the circulation of the fresh air from cooling the drum.

To accomplish this, a fixed divider is arranged along the interior of the drum and coaxial with the drum. The divider has a shape which corresponds generally to that of the drum and acts to separate a central enclosure from a type of annular section through which project, across the wall, the nozzles of the burners while the air inlet orifice of each burner is disposed on the portion of the burner located within the central container.

Thus, the gases are forced to circulate adjacent to the wall of the drum and, furthermore, cannot mix with the fresh air.

Advantageously the divider projects beyond the drum at each end thereof and has ends which are flared or bent at right angles to the divider and towards the exterior.

Thus the hot gases, which tend to go upwardly, escape towards the top adjacent to the extremities of the upper surface of the drum without risk of mixing with the fresh air which, itself, cannot contact the interior wall of the drum.

In order to increase the surface of the wall of the drum which is contacted by the hot gases and to thus maximize the heat exchange between these gases and the metal mass of the drum, another object of the invention is to provide a plurality of hollows and reliefs on the interior face of the wall.

Preferably, the hollows are constituted by a succession of circular grooves, coaxial with the drum. Furthermore, these grooves act as so many guides in order to increase the heating surface, by maintaining the hot gases in contact with the metal cylinder as long as possible by reducing turbulences.

By way of non-limiting example, and with reference to the drawings, a continuous heating or cooking machine for food crepes is illustrated which comprises at least one drum, only a single drum being illustrated, which is metallic and is hollow and which turns around its substantially horizontal axis by virtue of rotatable rollers such as 2 on which the drum rests.

The cylinder 1, on which the crepes are baked, is heated interiorly by burners 4 with a combustible fluid fed to the burners by a tube 3 (arrow F1, FIG. 2).

The nozzles of the burners open near the interior surface of the cylinder 1 and each produce a flame 6 which is initially substantially perpendicular, to the corresponding diametral plane.

The device illustrated may be used to make crepes and all of the burners are shown as being in the same single plane so that at a given moment the temperature on the cylinder varies, however feebly, from one section of the circumference to another. However it must be understood that the invention is not limited to the embodiment specifically disclosed and remains applicable with any other arrangement depending upon the necessities of operation or yield, e.g., burners offset angularly one with respect to the other or in series, plurality of burners in the same cross-sectional plane, etc. The invention is, therefore, not limited to the structure specifically disclosed and extends to all equivalent structures.

A fixed divider 9 is arranged on the interior of the drum 1. It is coaxial with the drum and has the same general shape as the drum, i.e., cylindrical in the embodiment shown. It is made out of steel plate, for example. This divider separates, on the interior of the drum, a central container 7 from a space 8 having an annular cross-section. The divider is bored with a plurality of holes 10 across which pass respectively the ends of the burners 4. The air feed 5 of each burner is arranged on the portion of the burner located within the container 7.

Such an arrangement forces the hot gases of each plane to circulate adjacent to the wall of the drum 1 thus increasing the duration of contact with the metallic mass.

The contact is maintained until the moment that the hot gases have no further tangential speed (zone 11) and tend to rise under turbulent conditions (arrows F2).

When considering only the "piping" aspect of the flames, the divider 9 can be incomplete and interrupted at the end of the said flames (zone 11), without extending beyond the scope of the invention. Nevertheless, it is most preferable to extend the divider over the entire circumference of the drum for the following reasons. First, this makes it possible to utilize, where necessary, the maximum gas pressure (the flame making a complete turn) and, second, cutting will prevent the divider 9 from incompletely performing its other functions, i.e., to prevent the fresh feed air of the burners from contacting and cooling the interior surface of the drum as well as preventing the mixture of the burned gases with the fresh air.

In order to provide for the separation of the burned gases from the fresh air which enters the container 7 via the two ends (F3), the divider 9 extends beyond the drum at each end and its extremities 12a and 12b are turned at a right angle towards the exterior. These extremities may if desired be only flared, the aim being to prevent the burned gas which no longer has the tangential speed for escaping laterally, for example at 13 where the loss of tangential speed occurs at the level of the lower surface, and to rise along the ends of the drum thereby depriving the air entering the interior of the container 7 of its oxygen. The burned gases leaving at 13 are warm and tend to rise. With the extremities 12a and 12b bent, the gases cannot escape laterally and rise along the exterior face of the divider 9 to escape at 14 as shown by arrows F4 without having been in contact with the fresh air.

According to another embodiment of the invention shown clearly in FIG. 2, the interior surface of the drum wall comprises hollows and projections so as to increase the contact surface with the flames. Here, this relief is formed by a succession of circular grooves 15 which are coaxial with the drum. Besides having the effect of increasing the contact surface, one obtains guidance of the gas which reduces whirling and turbulence and thus favors prolonged contact with the metallic mass of the drum.

As has been noted above, the cylinder of the heater which has been described above represents only one embodiment of the invention. Numerous modifications may be performed without going beyond the scope of the invention, particularly with respect to the distribution and the arrangement of the burners.

What is claimed is:

1. A heating device comprising:
   (a) at least one drum having a drum wall open at both ends thereof, said drum being positioned along an axis and being adapted to rotate continuously around a substantially horizontal axis;
   (b) at least one burner arranged within said drum, said burner comprising:
      (i) a nozzle adapted to direct a flame substantially perpendicular to a diametral plane of said drum; whereby heated gas is circulated adjacent to the wall of said drum; and
      (ii) an air inlet for providing oxygen to said burner;
   (c) a divider which is fixed with respect to said drum and is arranged to divide the interior space of said drum into a central space, and an exterior space positioned between said divider and said drum; and whereby said burner nozzle is positioned in said exterior space while said air inlet to said burner is positioned within said central space.

2. The heating device as defined by claim 1 wherein said drum is metallic and said fixed divider is positioned along an axis coaxial with said drum and has substantially the same shape as said drum whereby said exterior space is annular.

3. The heating device as defined by claim 2 wherein said divider has outer edges and the outer edges of said divider extend beyond the corresponding ends of said drum whereby heated gases generated within said annular space are directed away from air entering said divider towards said air inlet.

4. The heating device as defined by claim 3 wherein said outer edges are bent to form a right angle with respect to the divider.

5. The heating device as defined by claim 3 wherein said outer edges are flared outwardly.

6. The heating device as defined by any one of claims 1, 2, 3, 4, or 5 wherein said drum comprises a drum wall having a plurality of recesses and projections on the interior surface thereof adapted to increase the surface area of contact between heated gases generated within said exterior space.

7. The heating device as defined by any one of claims 1, 2, 3, 4, or 5 wherein said drum comprises a drum wall and the interior surface of said drum wall comprises a plurality of grooves positioned along an axis coaxial with said drum for guiding heated gases upwardly within said exterior space.

8. The heating device as defined by claim 1 wherein said drum is adapted to bake crepes.

9. The heating device as defined by claim 1 comprising a plurality of burners longitudinally positioned within said drum.

* * * * *